(12) United States Patent  
Dew et al.

(10) Patent No.: US 10,739,748 B2  
(45) Date of Patent: Aug. 11, 2020

(54) INSTRUMENTATION COMPOSITE INTEGRATION SYSTEM

(71) Applicant: LOCKHEED MARTIN CORPORATION, Bethesda, MD (US)

(72) Inventors: Nathaniel Dew, Milford, CT (US); Jonathan K. Garhart, Seymour, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/141,114

(22) Filed: Sep. 25, 2018

(65) Prior Publication Data

US 2020/0096963 A1 Mar. 26, 2020

(51) Int. Cl.
 *G05B 19/18* (2006.01)
(52) U.S. Cl.
 CPC .. *G05B 19/182* (2013.01); *G05B 2219/36198* (2013.01); *G05B 2219/49077* (2013.01)
(58) Field of Classification Search
 CPC ........ G05B 19/182; G05B 2219/36198; G05B 2219/49077
 See application file for complete search history.

(56) References Cited

U.S. PATENT DOCUMENTS

| | | | |
|---|---|---|---|
| 5,879,109 A * | 3/1999 | Finzel | E02F 5/12 138/105 |
| 6,012,883 A * | 1/2000 | Engwall | B23Q 3/086 409/132 |
| 6,798,970 B1 | 9/2004 | Brown et al. | |
| 7,630,591 B2 | 12/2009 | Allen et al. | |
| 9,550,349 B1 * | 1/2017 | Larsen | B32B 38/0004 |
| 10,016,932 B2 | 7/2018 | Moore et al. | |
| 2009/0083050 A1 | 3/2009 | Eltman et al. | |
| 2009/0198369 A1 * | 8/2009 | Xu | B26D 5/20 700/173 |
| 2012/0063862 A1 * | 3/2012 | Epplin | B23Q 3/088 409/131 |
| 2013/0302103 A1 * | 11/2013 | Sona | G05B 19/40937 409/80 |
| 2013/0325160 A1 * | 12/2013 | Gustavsson | E02F 5/12 700/117 |
| 2017/0183107 A1 | 6/2017 | Brookhart et al. | |

* cited by examiner

*Primary Examiner* — Christopher E. Everett
(74) *Attorney, Agent, or Firm* — Cantor Colburn LLP

(57) ABSTRACT

According to an aspect, an apparatus is provided. The apparatus includes a cutter, a spooling mechanism and a computing system. The computing system is configured to drive the cutter to form a channel in the ply based on the stored instrumentation layout. The computing system is additionally configured to drive the spooling mechanism to insert the instrumentation into the formed channel based on the stored instrumentation layout.

16 Claims, 4 Drawing Sheets

INSTRUMENTATION COMPOSITE INTEGRATION SYSTEM

STATEMENT OF FEDERAL SUPPORT

This invention was made with government support under contract W911W6-16-2-0017 awarded by the Defense Advanced Research Procurement Agency (DARPA). The government has certain rights in the invention.

BACKGROUND OF THE INVENTION

The subject matter disclosed herein generally relates to automated machinery used to cut various materials, and is more particularly directed to a system for cutting material and forming composite parts.

Manufacturing composite parts traditionally occurs by cutting individual pieces of material from large rolls and assembling the composite part by arranging the pieces in a specific configuration to create a desired part or component. The pieces can be bonded together to form a laminate with multiple laminated layers. This composite part may be custom-engineered to have specific mechanical properties appropriate for its intended use.

For certain parts or components, instrumentation or other devices to obtain diagnostic information is desired to acquire performance information from the parts or components when used in operation. Instrumentation placement on the parts or components is usually accomplished by hand, which is labor intensive and time consuming. Correct placement of instrumentation, for example, fiber optic filaments, is challenging due to the fragility of the instrumentation, the shape of the piece of material, a desired instrumentation layout on the piece of material and difficulty maintaining adhesion to the piece of material. Moreover, because the instrumentation is most often laying on the piece of material, positioning of the piece of material in the mold or actual operation of the composite part can damage the instrumentation. Hand placement of instrumentation can be problematic because the instrumentation is difficult to handle, and it can be damaged or misaligned.

BRIEF DESCRIPTION OF THE INVENTION

According to an aspect of the invention, an apparatus is provided. The apparatus includes a cutter, a spooling mechanism and a computing system. The computing system is configured to drive the cutter to form a channel in the ply based on the stored instrumentation layout. The computing system is additionally configured drive the spooling mechanism to insert the instrumentation into the formed channel based on the stored instrumentation layout.

In addition, the computing system can be configured to receive a design of one or more composite parts and drive the cutter to form a pattern in the ply based to the received design.

In addition, the cutter can include a blade that can be used to cut one or more patterns into the ply in response to the received design of the one or more composite parts.

In addition, the channel formation and the insertion of the instrumentation can occur prior to laying up the plies to create a composite part.

In addition, the instrumentation can include at least one of a fiber optic filament.

According to further aspects of the invention, a method for placing instrumentation within one or more plies of a composite part can be provided. The method can include receiving, by a processor, an instrumentation layout. The method can further include forming, by a cutter, a channel in one or more plies based on the instrumentation layout. The method can further include inserting, by a spooling mechanism, instrumentation into the channel.

According to further aspects of the invention, a system for placing instrumentation within one or more plies of a composite part is provided. The system includes a material cutting machine, and a computer system coupled to the material cutting machine. The processing system includes a processor and memory having instructions stored thereon that, when executed by the processor, cause the autonomous system to: receive an instrumentation layout; form a channel in one or more plies based on the instrumentation layout; and insert instrumentation into the channel.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments described herein allows for the placement of instrumentation within a ply in an automated fashion. A user can input a design for a composite part and an instrumentation layout and receive an output of a sheet of material (ply) including a channel housing the instrumentation. The channel is used to provide a cavity for the fiber optic filament to prevent the distortion of adjacent laminate filaments and local resin pockets. It additionally provides protection for the fiber optic filament to reduce spatial distortion during cure and incorporates the fiber optic filament into a ply structure to facilitate subsequent handling and layup. The instrumented ply can be grouped with other plies and molded into the composite part.

Figure 1:
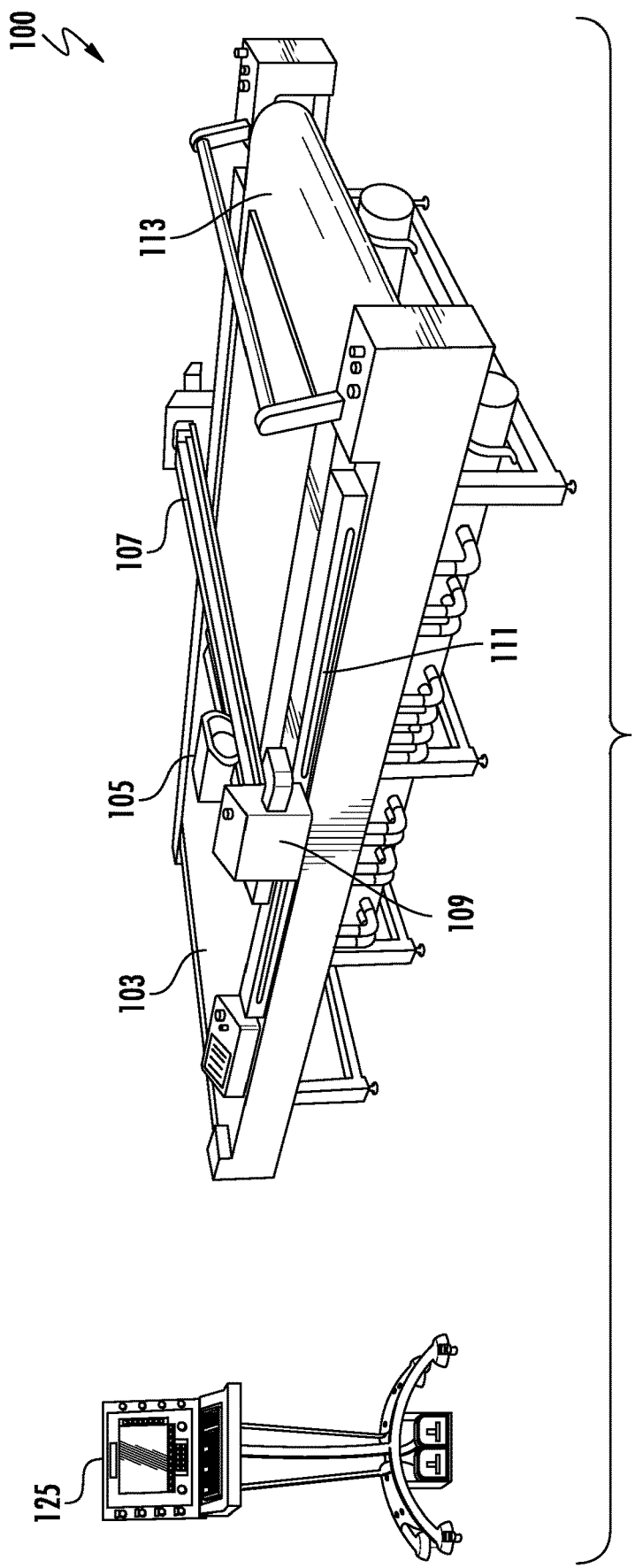
FIG. 1 illustrates an example of a material cutting machine.

Referring now to the drawings, FIG. 1 illustrates a material cutting machine 100. The material cutting machine 100 can include a cutting table 113 and a computer numerical controlled (CNC) processing system 125 which controls the operation of the cutting table 113 in accordance with a cutting program. Commands from the CNC processing system 125 can be transmitted to the cutting table 113 via any suitable wired or wireless protocol. An X-carriage 107 can be mounted above the cutting table 113. The X-carriage 107 can be movable in an X-coordinate direction relative to the cutting table 113. The X-carriage 107 can be supported at opposite ends by suitable bearings (not shown) located on opposite longitudinal sides of the cutting table 113. A drive shaft 109, having a drive gear that can be used to move the carriage in the X-direction along engagement racks 111. The X-carriage 107 can support a Y-carriage 105 operable to move in a Y-coordinate direction relative to the X-carriage 107. The Y-carriage 105 can include a cutting head (not shown) that can include a reciprocating cutting blade. The cutting head can be moved along a designated line in accordance with a combined movement of the X-carriage 107 and Y-carriage 105 in X and Y coordinate directions in response to commands received from a cutting program stored on the CNC processing system 125. A blade (not shown) can be coupled to the cutting head and can be driven at a predetermined rate in response to commands issued from the cutting program. The cutting machine 100 can use the cutting head to cut a single sheet of material (ply) 103 and create a layup comprising multiple sheets of material (plies). The plies can be used to create a composite part or component (part) by arranging the plies in a specific configuration within a mold cavity which is used to form the composite part.

For certain composite parts, operational/performance information for the composite parts is desired. The operational/performance information can be used for a variety of reasons, for example, health monitoring, maintenance of the composite parts, as well as end of life decisions for the composite parts.

Figure 2:
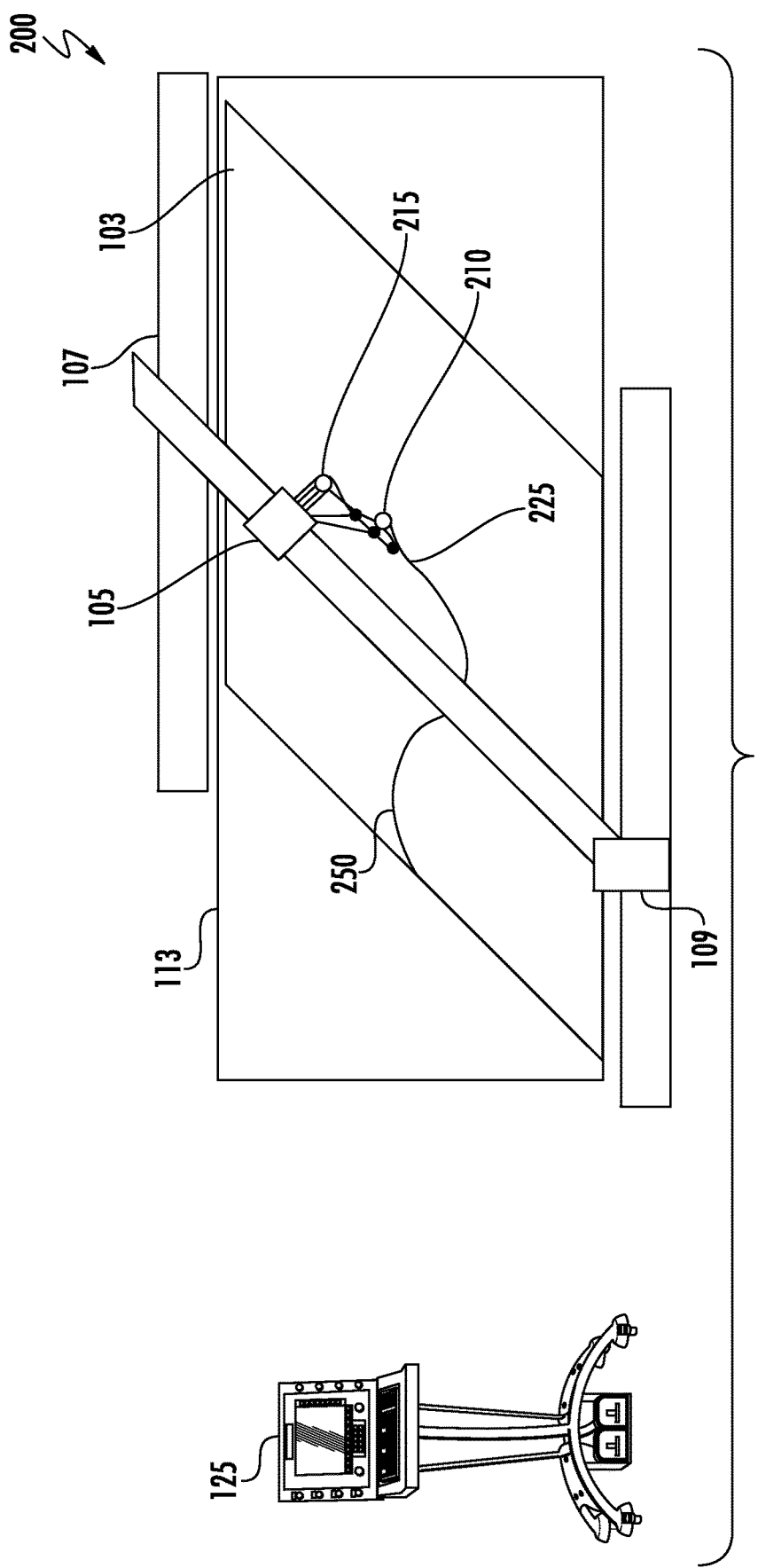
FIG. 2 illustrates an exemplary material cutting machine according to an embodiment.

FIG. 2 illustrates an exemplary material cutting machine 200 including instrumentation 250 according to an embodiment. The material cutting machine 200 can include the cutting table 113, the CNC processing system 125, X-carriage 107, Y-carriage 105 and drive shaft 109 of FIG. 1. The Y-carriage 105 can also include a blade 210 and a spooling mechanism 215. Accordingly, a designer can use the CNC processing system 125, further described in FIG. 4, which can be communicatively coupled to the material cutting machine 200, to implement a design program in order to represent patterns associated with individual single layer pieces (e.g., ply 103), as well as indicate a desired material of choice to design the composite part based on a variety of design factors, including strength, weight, and orientation.

In addition, the designer can use the CNC processing system 125 to layout placement of instrumentation within one or more pieces of material 103. The Y-carriage 105 can be responsive to the designer's instrumentation layout and can instruct a blade 210 to cut/remove portions of a piece of material (ply) 103 thereby forming a channel 225 in the piece of material 103. Instrumentation 250 can be placed in the channel 225 using, for example, a spooling mechanism 215. The spooling mechanism 215 can house a variety of instrumentation types (e.g., fiber optic filaments or the like), which can be placed in the channel 225.

The channel 225 can be used to provide a cavity for the instrumentation 250 to prevent a distortion of adjacent laminate filaments and local resin pockets. Additionally, the channel 225 can provide protection for the instrumentation 250 in order to reduce spatial distortion during cure and incorporates the instrumentation into a ply structure to facilitate subsequent handling and layup. Accordingly, the material cutting machine 200 can perform an automated placement of instrumentation 250 within a channel 225 of a consolidated ribbon or full ply which allows for easier handling and more accurate placement of the instrumentation 250 than manual placement. In addition, time is reduced because technicians do not have to add the instrumentation 250 by hand to the pieces of material after the pieces have been cut, although aspects of the invention can use manual placement in addition to using the placement by the machine 200.

Figure 3:
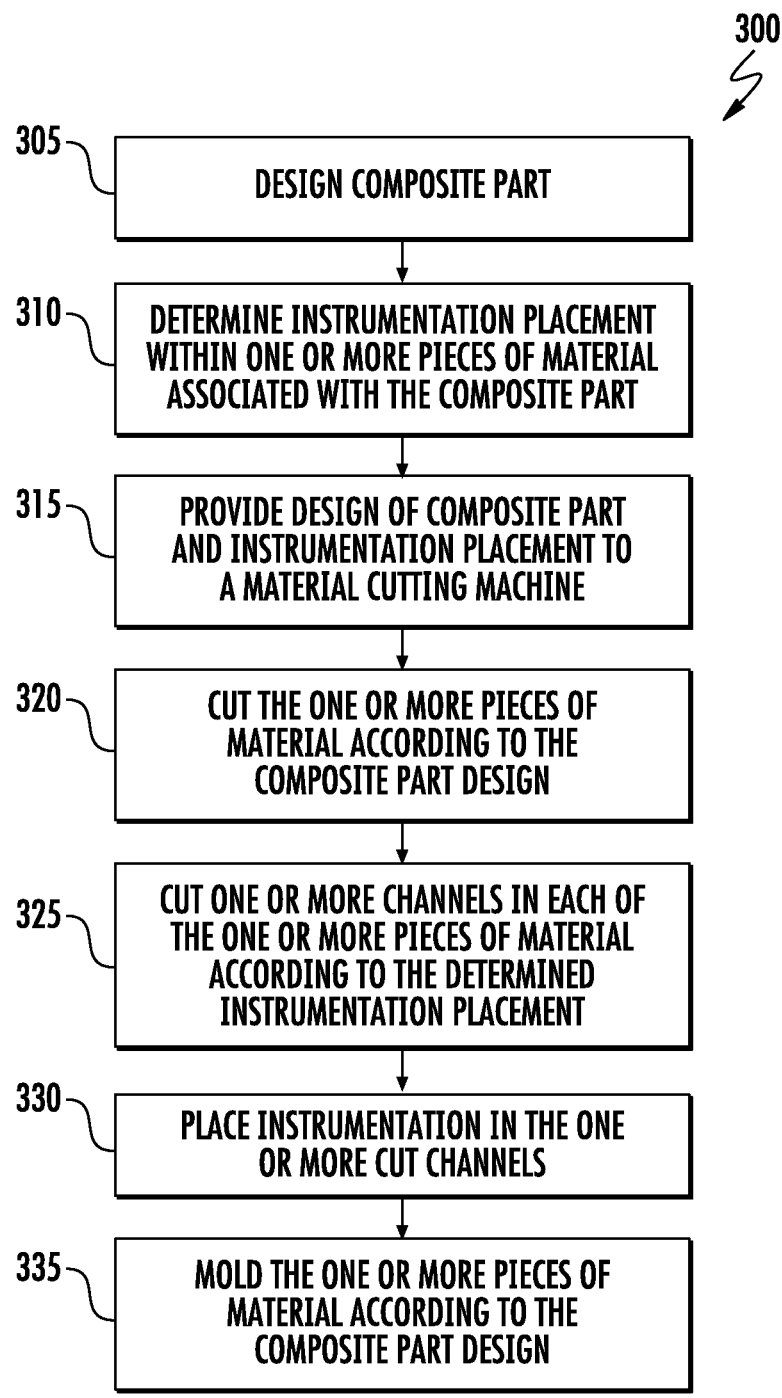
FIG. 3 illustrates a flow diagram of a method for placing instrumentation within one or more plies of a composite part according to an embodiment.

FIG. 3 depicts a flow diagram of a method 300 for placing instrumentation 250 within one or more plies of a composite part according to an embodiment. At block 305, a designer can design one or more composite parts, using a computing system, for example CNC processing system 125. The designer can specify, for each ply of the composite part, a pattern, material to be used, shape, thickness, and other like parameters, which can be entered into a material cutting machine (e.g., material cutting machine 200) or transmitted to the material cutting machine. At block 310, the designer can indicate where instrumentation 250 should be placed on a designated ply 103 used to form the composite part (i.e., an instrumentation layout). The designer can also indicate what type of instrumentation (sensor, strain gauge, fiber optic filament, or the like) will be placed on the designated ply 103 in the instrumentation layout. At block 315, the design of the one or more composite parts and the associated instrumentation layout is sent from the computing system to the material cutting machine 200. At block 320, the material cutting machine 200 cuts the ply 103 in a pattern specified by the design of the one or more composite parts.

At block 325, the material cutting machine 200 can cut or remove portions of the ply 103 in a manner specified by the instrumentation layout to form one or more channels 225 within the ply. At block 330, the material cutting machine 200 can place instrumentation 250 in the one or more channels 225, which has been specified by the designer. The process is repeated for other plies 103 used to make up the composite part. At block 335, plies 103 associated with the design of the one or more composite parts can be placed in a mold (not shown) thereby forming the one or more composite parts.

Figure 4:
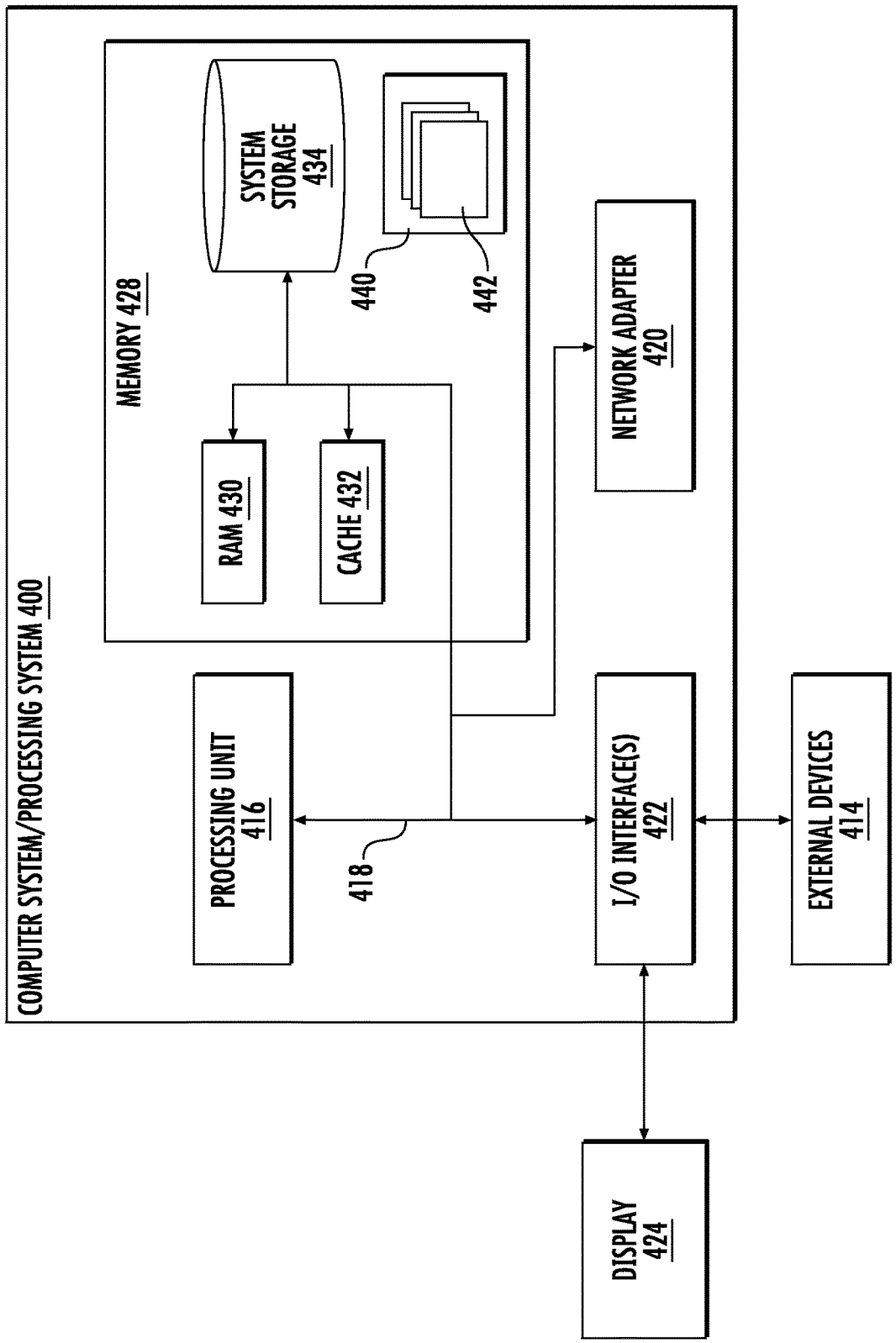
FIG. 4 illustrates a schematic of an example of a computing system/processing system which can be utilized to implement any features according to an embodiment.

FIG. 4 depicts a schematic of an example computing system/processing system 400 according to an embodiment which executes the method shown in FIG. 3. The computing system/processing system 400 can be representative of various types of computer systems and devices on which embodiments can be implemented, as well as, a material cutting machine. Various processors, computers, computing systems, processing systems, electronics, controls, panels, features, sensors, systems, etc., can utilize, be implemented in, be integrated with, and/or include any of the elements of computing system/processing system 400. Any feature in computing system/processing system 400 can incorporate and/or implement any aspect of embodiments discussed herein. Any feature in computing system/processing system 400 can be incorporated into the CNC processing system 125 and/or the material cutting machine 200.

Examples of well-known computing systems, environments, and/or configurations that may be suitable for use with computing system/processing system 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing system/processing system 400 may be described in the general context of computer system-executable instructions, such as program modules, being executed by a computer system. Generally, program modules may include routines, programs, objects, components, logic, data structures, and so on that perform particular tasks or implement particular abstract data types. Computing system/processing system 400 may be practiced in distributed cloud computing environments where tasks are performed by remote processing devices that are linked through a communications network. In a distributed cloud computing environment, program modules may be located in both local and remote computer system storage media including memory storage devices.

The components of computing system/processing system 400 may include, but are not limited to, one or more processors or processing units 416, a system memory 428, and a bus 418 that couples various system components including system memory 428 to processor 416. Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system/processing system 400 can include a variety of computer system readable media. Such media may be any available media that is accessible by computing system/processing system 400, and it includes both volatile and non-volatile media, removable and non-removable media. The system memory 428 can include computer system readable media in the form of volatile memory, such as random access memory (RAM) 430 and/or cache memory 432. Computing system/processing system 400 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. Memory 728 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computing system/processing system 400 may also communicate with one or more external devices 714 such as a keyboard, a pointing device, a display 424, etc.; one or more devices that enable a user to interact with computer system/server 412; and/or any devices (e.g., network card, modem, satellite, etc.) that enable computing system/processing system 400 to communicate with one or more other computing devices. Such communication can occur via Input/Output (I/O) interfaces 422. Still yet, computing system/processing system 400 can communicate with one or more networks such as a local area network (LAN), a general wide area network (WAN), and/or a public network (e.g., the Internet) via network adapter 420. As depicted, network adapter 420 communicates with the other components of computing system/processing system 400 via bus 418. It should be understood that although not shown, other hardware and/or software components could be used in conjunction with computing system/processing system 400. Examples include but are not limited to: microcode, device drivers, redundant processing units, external disk drive arrays, RAID systems, tape drives, and data archival storage systems, etc.

Technical effects and benefits include an automated system that can place instrumentation within a cut pattern formed within a consolidated ribbon or full ply Carrier Sheet, which allows for easier handling and more accurate placement than manual instrumentation placement. The system allows a user to input a composite design and receive an output of a ply pattern including channels which can be used to place of instrumentation in an automated fashion. The system can generate an optimized path for the instrumentation placement within the ply depending on instrumentation properties and design inputs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus for inserting instrumentation into a ply used to create a composite part, the apparatus comprising:
   a cutter attached to a carriage over a cutting table;
   a spooling mechanism attached to the carriage over the cutting table;
   a memory storing an instrumentation layout for the placement of the instrumentation in the ply; and
   a processor coupled to the memory, wherein the processor is operable to:
      drive the cutter over the cutting table to form a channel in at least one sheet of the ply at least partly contained on the cutting table by controlling the carriage attached to the cutter to cut portions of the at least one sheet of the ply, based on the stored instrumentation layout; and
      drive the spooling mechanism over the cutting table to insert the instrumentation into the formed channel in the at least one sheet based on the stored instrumentation layout.

2. The apparatus of claim 1, wherein the processor is further operable to receive a design of a composite part and drive the cutter to form a pattern in the ply based to the received design.

3. The apparatus of claim 1 wherein the cutter includes a blade, and the processor drives the blade to cut one or more patterns into the ply to form the channel in response to the based on the stored instrumentation layout.

4. The apparatus of claim 1, wherein the channel formation and insertion of the instrumentation occurs prior to a layup of the plies to create a composite part.

5. The apparatus of claim 1, wherein the instrumentation comprises a fiber optic filament.

6. The apparatus of claim 1, further comprising another carriage designed to move in an x-coordinate direction relative to the cutting table, the another carriage being coupled to a drive shaft and configured to support the carriage, wherein the carriage is designed to move in a y-coordinate direction perpendicular to the x-coordinate direction.

7. A method for placing instrumentation within one or more plies of a composite part, the method comprising:
receiving, by a processor, an instrumentation layout;
forming, by a cutter attached to a carriage over a cutting table, a channel in at least one sheet of one or more plies at least partly contained on the cutting table by controlling the carriage attached to the cutter to cut portions of the at least one sheet based on the instrumentation layout;
inserting, by a spooling mechanism attached to the carriage over a cutting table, instrumentation into the channel in the at least one sheet.

8. The method of claim 7 further comprising molding the one or more plies into one or more composite parts.

9. The method of claim 8, wherein the instrumentation comprises a fiber optic filament stored on the spool of the spooling mechanism prior to inserting the instrumentation into the formed channel.

10. The method of claim 7 further comprising receiving, by the processor, a design of the one or more composite parts and forming a pattern in the ply based to the received design.

11. The method of claim 10 further comprising using a blade of the cutter to cut one or more patterns into the ply in response to the received design of the one or more composite parts.

12. The method of claim 7, wherein the channel and inserting the instrumentation occurs prior to laying up the plies to create a composite part.

13. A system for placing instrumentation within one or more plies of a composite part, the system comprising:
a material cutting machine comprising a cutter attached to a carriage over a cutting table and a spooling mechanism attached to the carriage over the cutting table; and
a computer system coupled to the material cutting machine, the computer system comprising a processor and memory having instructions stored thereon that, when executed by the processor, cause the material cutting machine to:
receive an instrumentation layout;
form, using the cutter over the cutting table, a channel in at least one sheet of one or more plies at least partly contained on the cutting table by controlling the carriage attached to the cutter to cut portions of the at least one sheet based on the instrumentation layout; and
insert, using the spooling mechanism over the cutting table, instrumentation into the channel in the at least one sheet.

14. The system of claim 13, wherein the cutting machine is further operable to receive a design of the one or more composite parts and form a pattern in the ply based to the received design.

15. The system of claim 13, wherein the cutting machine is further operable to use a blade of the cutting machine to cut one or more patterns into the ply in response to the received design of the one or more composite parts.

16. The system of claim 13, wherein the channel formation and insertion of the instrumentation occurs prior to laying up the plies to create a composite part.

* * * * *